United States Patent [19]
Cole

[11] Patent Number: 5,867,529
[45] Date of Patent: Feb. 2, 1999

[54] SHAPING FILTER FOR HIGH DATA RATE SIGNALLING

[75] Inventor: Paul Dana Cole, Fairfield, Conn.

[73] Assignee: General Datacomm, Middlebury, Conn.

[21] Appl. No.: 810,701

[22] Filed: Mar. 3, 1997

[51] Int. Cl.$^6$ ................................................. H04B 14/04
[52] U.S. Cl. ............................................ 375/242; 375/295
[58] Field of Search .................................. 375/295, 296, 375/222, 242, 229, 300; 332/149; 379/93.01

[56] References Cited

U.S. PATENT DOCUMENTS

| | | | |
|---|---|---|---|
| 4,924,492 | 5/1990 | Gitlin et al. | 379/93.01 |
| 4,924,516 | 5/1990 | Bremer et al. | 380/46 |
| 5,031,195 | 7/1991 | Chevillat et al. | 375/232 |
| 5,311,547 | 5/1994 | Wei | 375/290 |
| 5,394,437 | 2/1995 | Ayanoglu et al | 375/222 |
| 5,406,583 | 4/1995 | Dagdeviren | 375/5 |
| 5,528,625 | 6/1996 | Ayanoglu et al. | 375/222 |

FOREIGN PATENT DOCUMENTS

PCT/US95/15924 12/1995 WIPO .

OTHER PUBLICATIONS

ITU–T Recommendation V.34, Sep. 1994, "Data Communication Over the Telephone Network".

"The Capacity of PCM Voiceband Channels", Kalet, et al., IEEE Intern'l Conference on Communications'93, pp. 507–511.

"A Mathematical Theory of Communication". Bell Systems Technical Journal, 27:379–423, 623–656.

*Primary Examiner*—Tesfaldet Bocure
*Attorney, Agent, or Firm*—David P. Gordon; David S. Jacobson; Thomas A. Gallagher

[57] ABSTRACT

A shaping filter for a PAM mapper is provided which manipulates incoming PAM code level signals to produce outgoing PAM code level signals whose frequency spectrum is shaped to meet desired criteria. In manipulating input code level values in(t), the shaping filter preferably utilizes previous output signal values without using previous incoming signal values. In a preferred embodiment, the output code level values out(t) are constrained to an output alphabet which is a predefined subset of code levels within the $\mu$-law constellation, and are obtained by manipulating the input signals according to an integer-valued shifting function such that out(t) are code level values within the output alphabet. The preferred shifting function S "shifts" in(t) by a number of places in the output alphabet in the direction opposite the sign of $$\sum_{i=1}^{N} a_i \, out(t - i)$$

to provide out(t), where out(t) are $\mu$-law code output level values at times t, and $a_i$ are weighting factors chosen to shape the frequency spectrum of out(t). The shaping filter may be used with multidimensional PAM constellations.

20 Claims, 8 Drawing Sheets

$d=12$

NON-NEGATIVE μ-LAW CODEC OUTPUT LEVELS 56 kbps
$d=12$

| 0 | 2 | 4 | (6) | 8 | 10 | 12 | 14 |
|---|---|---|---|---|---|---|---|
| 16 | (18) | 20 | 22 | 24 | 26 | 28 | (30) |
| 33 | 37 | 41 | (45) | 49 | 53 | (57) | 61 |
| 65 | (69) | 73 | 77 | (81) | 85 | 89 | (93) |
| 99 | (107) | 115 | (123) | 131 | (139) | 147 | (155) |
| 163 | (171) | 179 | (187) | 195 | (203) | 211 | (219) |

64 POSITIVE POINTS

| (231) | (247) | (263) | (279) | (295) | (311) | (327) | (343) |
|---|---|---|---|---|---|---|---|
| (359) | (375) | (391) | (407) | (423) | (439) | (455) | (471) |
| (495) | (527) | (559) | (591) | (623) | (655) | (687) | (719) |
| (751) | (783) | (815) | (847) | (879) | (911) | (943) | (975) |
| (1023) | (1087) | (1151) | (1215) | (1279) | (1343) | (1407) | (1471) |
| (1535) | (1599) | (1663) | (1727) | (1791) | (1855) | (1919) | (1983) |

| 2079 | 2207 | 2335 | 2463 | 2591 | 2719 | 2847 | 2975 |
|---|---|---|---|---|---|---|---|
| 3103 | 3231 | 3359 | 3487 | 3615 | 3743 | 3871 | 3999 |

| 4191 | 4447 | 4703 | 4959 | 5215 | 5471 | 5727 | 5983 |
|---|---|---|---|---|---|---|---|
| 6239 | 6495 | 6751 | 7007 | 7263 | 7519 | 7775 | 8031 |

NON-NEGATIVE μ-LAW CODEC OUTPUT LEVELS

|  | 0 | 2 | 4 | 6 | 8 | 10 | 12 | 14 |
|---|---|---|---|---|---|---|---|---|
| 50.667 kbps $d=32$ | (16) | 18 | 20 | 22 | 24 | 26 | 28 | 30 |
|  | 33 | 37 | 41 | 45 | (49) | 53 | 57 | 61 |
|  | 65 | 69 | 73 | 77 | (81) | 85 | 89 | 93 |
|  | 99 | 107 | (115) | 123 | 131 | 139 | (147) | 155 |
|  | 163 | 171 | (179) | 187 | 195 | 203 | (211) | 219 |
| 41 POSITIVE POINTS | 231 | (247) | 263 | (279) | 295 | (311) | 327 | (343) |
|  | 359 | (375) | 391 | (407) | 423 | (439) | 455 | (471) |
|  | 495 | (527) | (559) | (591) | (623) | (655) | (687) | (719) |
|  | (751) | (783) | (815) | (847) | (879) | (911) | (943) | (975) |
|  | (1023) | (1087) | (1151) | (1215) | (1279) | (1343) | (1407) | (1471) |
|  | (1535) | (1599) | (1663) | 1727 | 1791 | 1855 | 1919 | 1983 |
|  | 2079 | 2207 | 2335 | 2463 | 2591 | 2719 | 2847 | 2975 |
|  | 3103 | 3231 | 3359 | 3487 | 3615 | 3743 | 3871 | 3999 |
|  | 4191 | 4447 | 4703 | 4959 | 5215 | 5471 | 5727 | 5983 |
|  | 6239 | 6495 | 6751 | 7007 | 7263 | 7519 | 7775 | 8031 |

FIG.6a d=8

NON-NEGATIVE μ-LAW CODEC OUTPUT LEVELS

57.3333 kbps
d=8

0  2  (4)  6  8  10  (12)  14
16  18  (20)  22  24  26  (28)  30

33  (37)  41  (45)  49  (53)  57  (61)
65  (69)  73  (77)  81  (85)  89  (93)

99  (107)(115)(123)(131)(139)(147)(155)
(163)(171)(179)(187)(195)(203)(211)(219)

(231)(247)(263)(279)(295)(311)(327)(343)
(359)(375)(391)(407)(423)(439)(455)(471)

72 POSITIVE POINTS

(495)(527)(559)(591)(623)(655)(687)(719)
(751)(783)(815)(847)(879)(911)(943)(975)

(1023)(1087)(1151)(1215)(1279)(1343)(1407)(1471)
(1535)(1599)(1663)(1727)(1791)| 1855 | 1919 | 1983 |

| 2079 | 2207 | 2335 | 2463 | 2591 | 2719 | 2847 | 2975 |
| 3103 | 3231 | 3359 | 3487 | 3615 | 3743 | 3871 | 3999 |

| 4191 |  4447  4703  4959  5215  5471  5727  5983
         6239  6495  6751  7007  7263  7519  7775  8031

SHAPING FILTER FOR HIGH DATA RATE SIGNALLING

BACKGROUND OF THE INVENTION

1. Field of the Invention

The present invention relates to data communications equipment. More particularly, the present invention relates to shaping filters and filtering methods having advantageous applications in modems.

2. State of the Art

With the ever-increasing importance of telecommunications for the transfer of data as well as voice, there has been a strong effort to increase data transfer rates over the telephone wires. Recently, the ITU-T adopted the V.34 Recommendation (International Telecommunication Union Telecommunication Standardization Sector Recommendation V.34, Geneva, Switzerland 1994) which is hereby incorporated by reference herein in its entirety. The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, recently, there has been a thrust to provide additional standards recommendations which will increase data transfer rates even further (note the TIA TR-30.1 PAM Modem ad hoc group and the ITU-T Study Group 16).

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend, which is hereby incorporated by reference herein in its entirety, discusses similar techniques. All of the disclosures assume the use of PAM (pulse amplitude modulation) digital encoding technology (which broadly covers pulse code modulation (PCM) and other technologies) rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics, which are ostensibly based on Townshend, envision the use of the V.34 Recommendation technology for upstream communications.

As will be appreciated by those skilled in the art, the technologies underlying the V.34 Recommendation, and the proposed 56 kbps modem are complex and typically require the use of high-end digital signal processors (DSPs). One of the complex tasks of the modem is performed by the mapper. The mapper maps digital data into a sequence of digital signals chosen from a constellation which are converted into an analog signal by a D/A converter. In the V.34 Recommendation, the preferred constellation is a four-dimensional constellation, whereas in the envisioned 56 kbps modems, the constellation is envisioned as a one dimensional PAM constellation which complies with $\mu$-law (A-law in Europe) requirements. According to $\mu$-law requirements, which are set forth in ITU-T Recommendation G.711 which is hereby incorporated by reference herein in its entirety, the total constellation consists of 255 signal levels; 127 positive, 127 negative, and zero. Both the positive portion of the constellation and the negative portion of the constellation include eight sectors with sixteen points each (the positive portion of the constellation being shown in Appendix 1 hereto), with zero being a common point for both portions. As is well known in the art, the minimum distance between points in sector 1 of the constellation is a distance "2". In sector 2, the minimum distance is "4", while in sector 3, the minimum distance is "8". In the eighth sector, the minimum distance is "256".

Using the full PAM $\mu$-law constellation, theoretically, a bit rate of almost 64 kbps can be transmitted over the analog local loop to the digital network. However, the average power of such a constellation would be about −4 dBm, and the minimum distance between points would be a distance of "2". Such a large average power is undesirable when compared to the present restrictions of an average power of −12 dBm on the network; and such a minimum distance is also undesirable, with minimum distances of at least "4" and preferably "8" being considerably more desirable in reducing errors due to channel impairments.

In addition, the digital signals received by the mapper are typically independent of each other. As a result, the power spectral densities (power vs. frequency; also called the frequency spectra) of the received digital signals and outgoing signals are substantially flat. However, it is known that the hybrid transformer of a modem in the central office line-card introduces non-linear distortion which occurs primarily in the low frequency bands of the flat spectrum, especially in the range of DC (0 Hz) to 100 Hz. Therefore, it is desirable to suppress the low frequency components in the $\mu$-law output signal.

In order to suppress the undesirable low frequency components, it has been suggested that it would be desirable for the frequency spectrum for a high speed PAM modem transmission to be shaped to have a flat spectrum above 500 Hz, to be attenuated by 10 dB from the flat spectrum at 100 Hz, to be further attenuated by an additional 5 dB at 50 Hz, and to be extremely attenuated at or near DC. However, no known filters can accomplish this task while still meeting the $\mu$-law output signal requirements. Indeed, while linear filters of the form $$\text{out}(t) = \text{in}(t) - \sum_{i=1}^{N} a_i \text{out}(t-i),$$

are commonly used to shape a frequency spectrum, where in(t) represents input signals over time t, $a_i$ are weighting factors, and out(t) represents the filtered output signals, the filtered output signals of such a linear, filter will not, in general, correspond to $\mu$-law code level values. The commonly used linear filter is therefore unacceptable for these applications.

SUMMARY OF THE INVENTION

It is therefore an object of the invention to provide a shaping filter which filters μ-law code input indications to generate μ-law code output indications having a desired power spectral density (frequency spectrum).

It is another object of the invention to provide a shaping filter which mimics linear filtering in situations in which conventional linear filtering cannot be used.

It is an additional object of the invention to provide a shaping filter which is simple to implement and which does not require large computing and memory resources.

In accord with the invention, a shaping filter for a PAM mapper is provided which manipulates incoming indications of PAM code level signals to produce indications of outgoing PAM code level signals whose frequency spectrum is shaped to meet certain criteria. The shaping filter preferably utilizes previous indications of output signal values only (as opposed to previous indications of incoming signal values) in manipulating the indications of incoming signals.

According to a preferred aspect of the invention, the output signals out(t) are constrained to an output alphabet which is a predefined subset of code level values within the μ-law constellation. According to another preferred aspect of the invention, the output signals out(t) are obtained by manipulating indications of the input signal code level values (in(t)) according to an integer-valued shifting function such that out(t) are code level values within the output alphabet. The preferred shifting function S "shifts" in(t) by a number of places in the output alphabet in the direction opposite the sign of $$\sum_{i=1}^{N} a_i \, \text{out}(t-i)$$

to provide out(t), where out(t) are μ-law code level output values at times t, and $a_i$ are weighting factors chosen to shape the frequency spectrum of out(t). It will be appreciated that by shifting in(t) by a number of places, an out(t) is provided which is a discrete code level value within the μ-law constellation.

In a particular preferred embodiment of the invention, the shaping filter is used as part of a pulse amplitude modulation (PAM) mapper which is otherwise described in co-owned copending U.S. Ser. No. 08/801,066, (Docket GDC-101), filed Feb. 14, 1997, which is hereby incorporated by reference herein in its entirety. In the preferred embodiment, the mapper also includes a logic block, a constellation controller, a constellation memory, a PAM code output memory, and an output register. Bits received at the logic block are grouped and sent to the filter. The filter of the preferred embodiment is arranged to mimic a linear filter by shaping the frequency spectrum. However, in accord with the invention, the shaping filter provides output signals which represent discrete μ-law code level values. As discussed above, rather than performing a mathematically subtractive operation, as in a linear filter, the filter of the invention preferably manipulates the input signals in(t) (or labels thereof) according to an integer-valued shifting function such that the output signals out(t) are code level values (or labels thereof) within the output alphabet.

Additional objects and advantages of the invention will become apparent to those skilled in the art upon reference to the detailed description taken in conjunction with the provided figures.

DETAILED DESCRIPTION OF THE PREFERRED EMBODIMENTS

Figures 1, 2:
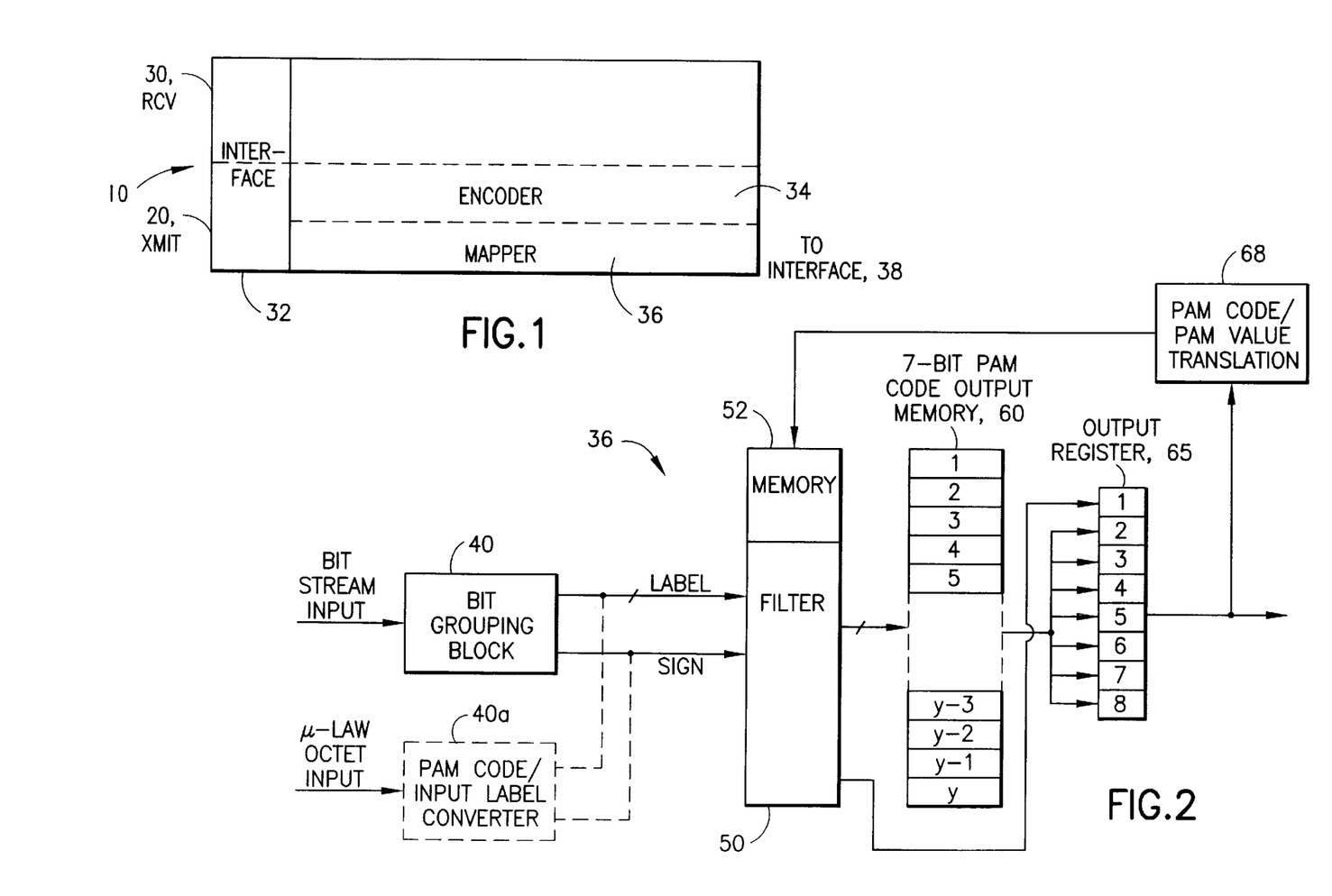
FIG. 1 is a high level block diagram of the PAM modem of the invention.
FIG. 2 is a block diagram of the mapper of FIG. 1 according to a first embodiment the invention.

Turning to FIG. 1, a high level block diagram of a PAM modem 10 is shown. The modem 10 broadly includes a transmitter 20 and a receiver 30. The transmitter includes an interface 32 to a source of digital data (such as a computer), an encoder 34 which includes a mapper 36 and may optionally include a Trellis or convolutional encoder (not shown), and an interface 38. Details of the receiver side of the modem are well known and are not shown in FIG. 1.

According to a first embodiment of the invention, and as seen in FIG. 2, the mapper 36 for the PAM (pulse amplitude modulation) encoder 34 preferably includes a bit grouping block 40, a filter 50 with associated memory 52, a PAM code output memory 60, and an 8-bit output register 65, and a PAM code to PAM value translator 68. It should be appreciated that the bit grouping block 40, filter 50, and PAM code to value translator 68 can be implemented in a single hardware element (e.g., a microprocessor), or separate hardware elements, or as software, or as a combination of software and hardware, while the PAM code output memory 60 and filter memory 52 can be implemented in one or more memory elements or registers either associated with or separate from the filter. The 8-bit output register 85 may be incorporated in the memory element with the PAM code output memory or may be a separate register as desired.

With the embodiment of FIG. 2, incoming bits of a bit stream are grouped by the bit grouping block 40 based on the desired data rate of the modem, as described in the previously incorporated related application. The group of bits (e.g., seven bits for a data rate of 56K) are sent to the filter 50 which preferably utilizes one bit as a sign bit, and the remainder of the bits as a label or indicator which can be said to indicate one of the values of an input alphabet (as discussed below). The filter 50 modifies or manipulates the incoming indicator in a manner also discussed below, and provides an output indicator which points to a location in the 7-bit PAM code output memory which effectively stores the positive indications (y in number) of an output alphabet. The seven bits stored at the indicated location of the PAM code output memory are then provided to the output register 65. In addition, as discussed below, in certain circumstances, the filter 50 can modify the sign bit. Regardless, the filter provides the sign bit (as modified, if modified) to the output register 65 as an eighth bit. The eight bit output which includes the sign and the output of the 7-bit PAM code output memory 60 are provided to the PAM code to PAM value translator 68 which stores the code and level values of Appendix 1, and feeds the PAM level back to the filter memory 52 for purposes described below. It should be noted that, if desired, the 7-bit PAM code output memory can be configured as an 8-bit PAM code output memory, with 2y registers for 2y output alphabet indications.

Before discussing details of the filter 50, it is noted that instead of receiving a bit stream input, it is possible that $\mu$-law octets may be received as inputs. In this case, a translation table 40a is provided which translates the incoming-PAM code to an input label and to a sign bit. The input label is preferably the digital value of position of the designated code in the input constellation, and the sign bit is taken directly from the sign bit of the octet. After translation by table 40a, processing proceeds as set forth above.

The filter 50 is designed so that the output of the filter chooses a location in the 7-bit PAM code output memory which provides a PAM code output, and so that the frequency spectrum of the PAM code output is shaped desirably as discussed below with reference to FIG. 4. In particular, according to a first embodiment of the invention, the filter 50 operates to mimic linear filtering by taking the input indication in(t), and manipulating the input indication according to an integer-valued function S such that the output code level value, out(t), falls within the constraints of the output alphabet; i.e., $$\text{out}(t) = \text{in}(t) << | >> S\left(\sum_{i=1}^{N} a_i \text{out}(t-i)\right),$$

denotes a shift in either the negative direction or the positive direction. Stated another way, the preferred shifting function S "shifts" in(t) by a number (k) of places in the output alphabet in the direction opposite the sign of $$\sum_{i=1}^{N} a_i \text{out}(t-i)$$

to provide out(t), where out(t) are $\mu$-law code level value output signals at times t, and $a_i$ are weighting factors chosen to shape the frequency spectrum of out(t). It will be appreciated that by shifting in(t) by a number of places, an out(t) is provided which is a discrete code level value within the $\mu$-law constellation.

In accord with a preferred aspect of the invention, the summation $$\sum_{i=1}^{N} a_i \text{out}(t-i) = V$$

is implemented as a simple geometric series such that v(t)=g out(t−1)+g$^2$ out(t−2)+g$^3$ out(t−3)+ . . . , with N effectively equalling infinity (N=∞) With a simple geometric series, those skilled in the art will appreciate that v(t) can be updated to v(t+1) by adding out(t) to v(t) and multiplying by constant g. Thus, in implementing the filter 50 as a simple geometric series, V can be easily calculated by storing the constant g in memory 52, feeding the present 8-bit code value output out(t) back to memory 52 as shown in FIG. 2, maintaining the previous value v(t) in the memory, and calculating v(t+1)=V=g(out(t)+v(t)). In a presently preferred embodiment of the invention g is set to 0.99.

While V is easily calculated (for a filter using a simple geometric series), it is only one part of the filter algorithm required for calculating a value for k which corresponds to the number of shifts made to the input label. According to the presently preferred algorithm, a variable x is set so that x equals the minimum of one, and the absolute value of V/denom, where denom is an expansion factor of the filter; i.e., $0 \leq x \leq 1$. Another variable p is set equal to $c_1 x - c_2 x^2$, where $c_1$ and $c_2$ are constants, which in a presently preferred embodiment of the invention are set to 45 and 25 respectively. The value k is then taken as the minimum of a constant maxshift, and the nearest integer rounded value of p. As will be discussed in more detail below, $c_1$ and $c_2$ are preferably chosen such that p should not exceed the constant maxshift. The constant maxshift, on the other hand, may be chosen to equal the difference between the number of positive members in the input and output alphabets, as discussed below with reference to FIG. 3.

Figure 3:
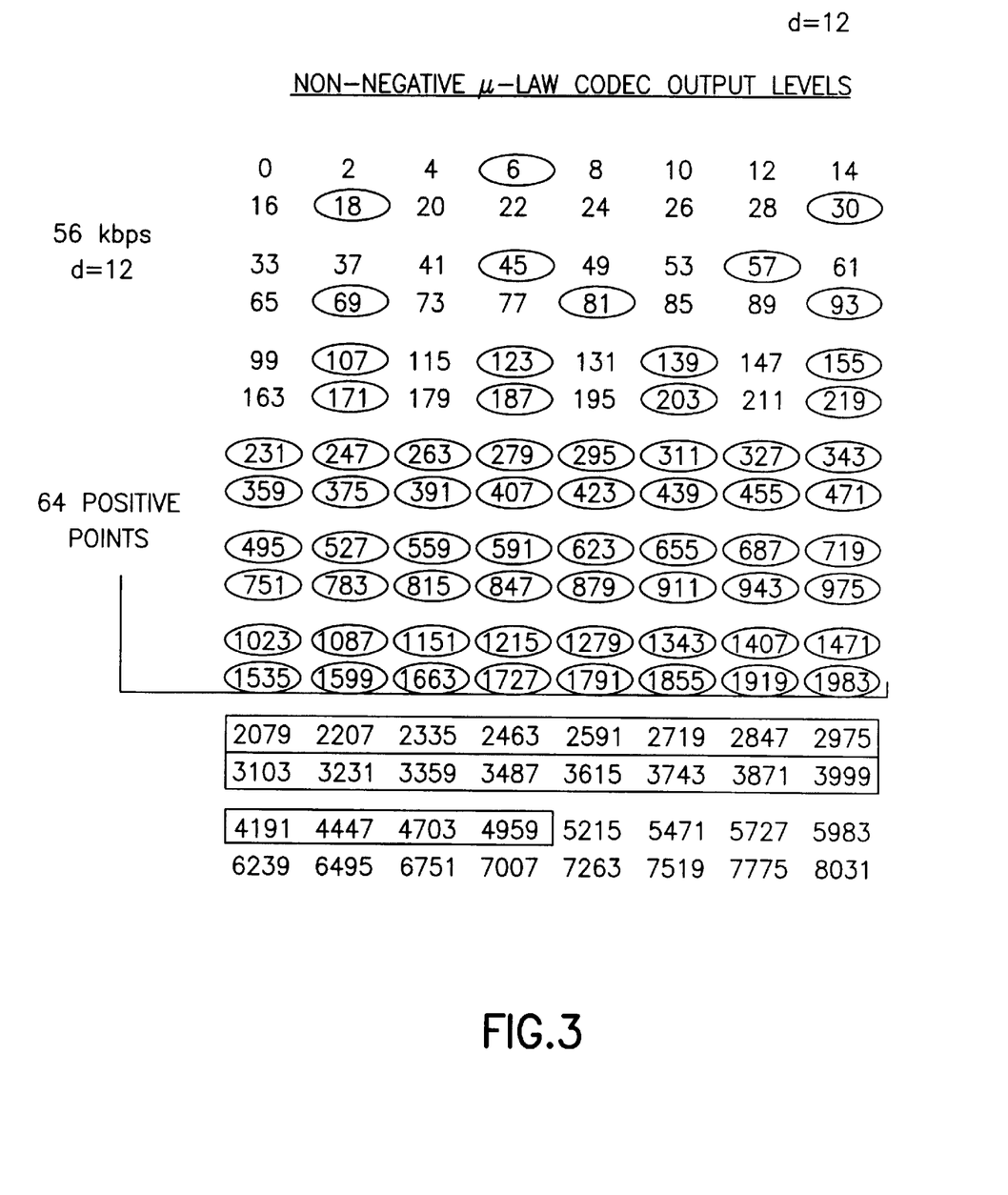
FIG. 3 is a chart of the non-negative μ-law code level values delimiting the input and output alphabets according to the first embodiment of the invention.

Turning to FIG. 3, a chart is seen of the non-negative $\mu$-law code levels delimiting the input and output alphabets according to the first embodiment of the invention. The input alphabet includes sixty-four positive points with minimum distance 12, which are indicated by the circled numbers, i.e., the input alphabet is a proper subset of the $\mu$-law alphabet. The output alphabet includes eighty-four positive points; the sixty-four points of the input alphabet plus the twenty points indicated by rectangles; i.e., the input alphabet is a proper subset of the output alphabet. Using the mapper of FIG. 2, seven bits are grouped together by bit grouping block 40. One of the seven bits is used as a sign bit, and the remaining six bits effectively identify one of the sixty-four points of the input alphabet. Using the six bits as an input label to the filter, a label shift k is determined (utilizing v(t), out(t), and g values, and the algorithm described above) in order to provide an output label which points to one of the eighty-four (y=84) 7-bit PAM code output memory locations. In other words, the value of k shifts the input in(t) between zero and twenty places, positive or negative, in the output alphabet to provide an output label which is used to generate out(t). The direction of the shift is the direction opposite the sign of V.

Because the largest positive code level in the output alphabet is twenty code levels greater than the largest positive code level of the input alphabet, a positive input code level may be shifted in the positive direction by between 0 and 20 levels and still be constrained to a code level within the output alphabet. Since the maximum shift is preferably set to 20 (maxshift=20), a shift of greater than 20 levels is prevented. In addition, a positive input code level can be shifted by between 0 to 20 levels in the negative direction to provide an output in the output alphabet. Positive input code levels subject to a shift in the negative direction which is greater than the number of code levels between the input code level and the first positive code level of the input alphabet, are shifted into negative code levels. This situation requires that the sign bit be changed by the filter 50 before being provided to the output register 65. Likewise, a negative input value may be shifted in the negative direction by between 0 and 20 levels and still be constrained to a code level within the output alphabet. Moreover, a negative input code level can be shifted by between 0 to 20 levels in the positive direction to provide an output in the output alphabet. Negative input code levels subject to a shift in the positive direction which is larger than the number of code levels between the input code level and the first negative code level of the input alphabet, are shifted into positive code levels thereby also necessitating a change in the sign bit.

By way of example, if the code level value in(t) is 1151 and p is calculated to equal thirty-one, according to the preferred algorithm, k is set to twenty (as k=minimum of p and maxshift), shifting in the positive direction results in an out(t) of 2847. If in(t) is 203 and the shift is 18 levels in the negative direction, out(t) is −45. If in(t) is −1279 and the shift is 13 in the negative direction, out(t) is −2207. If in(t) is −187 and the shift is 15 in the positive direction, out(t) is 18.

Figure 4:
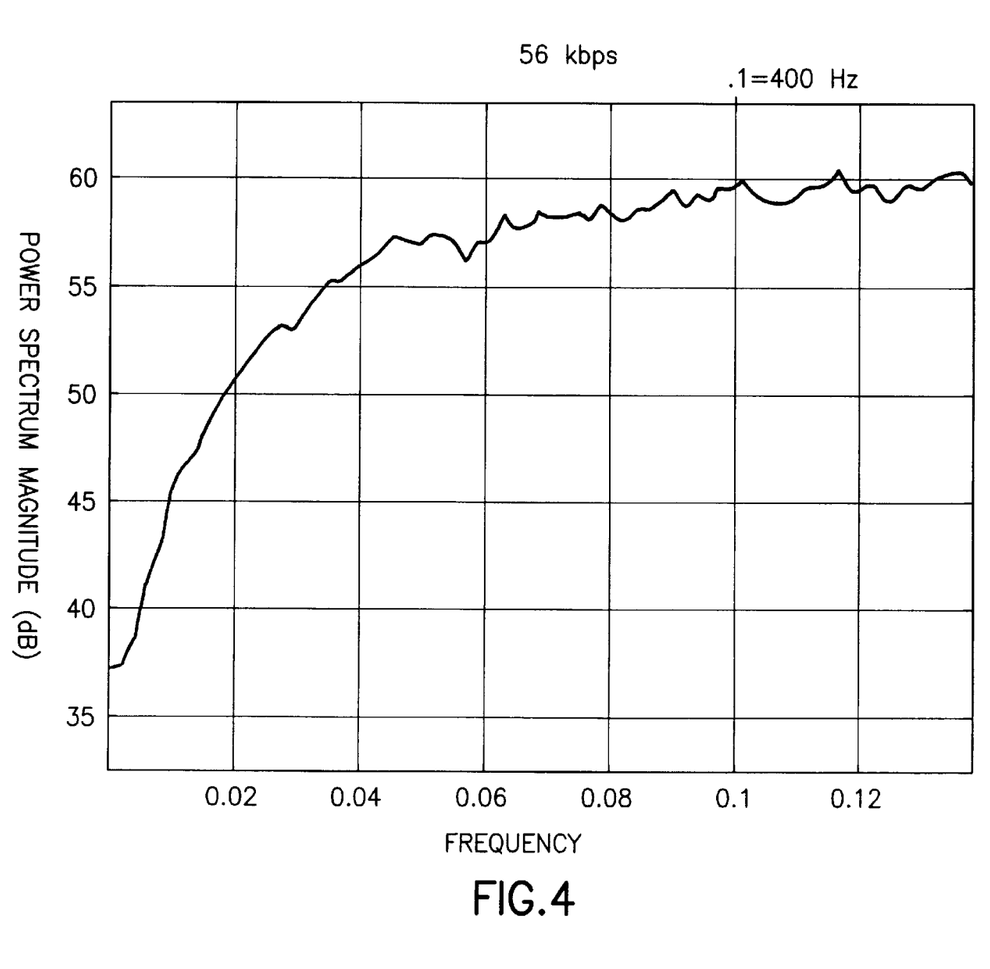
FIG. 4 is a diagram of a frequency spectrum of the output of the mapper of FIG. 2 using the input and output alphabets of FIG. 3.

Utilizing the preferred embodiment of the filter of the invention, the frequency spectrum of the output code levels is shaped as seen in FIG. 4, where the signal is attenuated approximately 8 dB at 100 Hz (from 60 dB of the flat spectrum to about 52 dB), further attenuated about 5 dB at 50 Hz (to about 47 dB), and extremely attenuated (down to about 37 dB) at or near DC. This shaped spectrum is generally suitable for modem performance.

Figure 5:
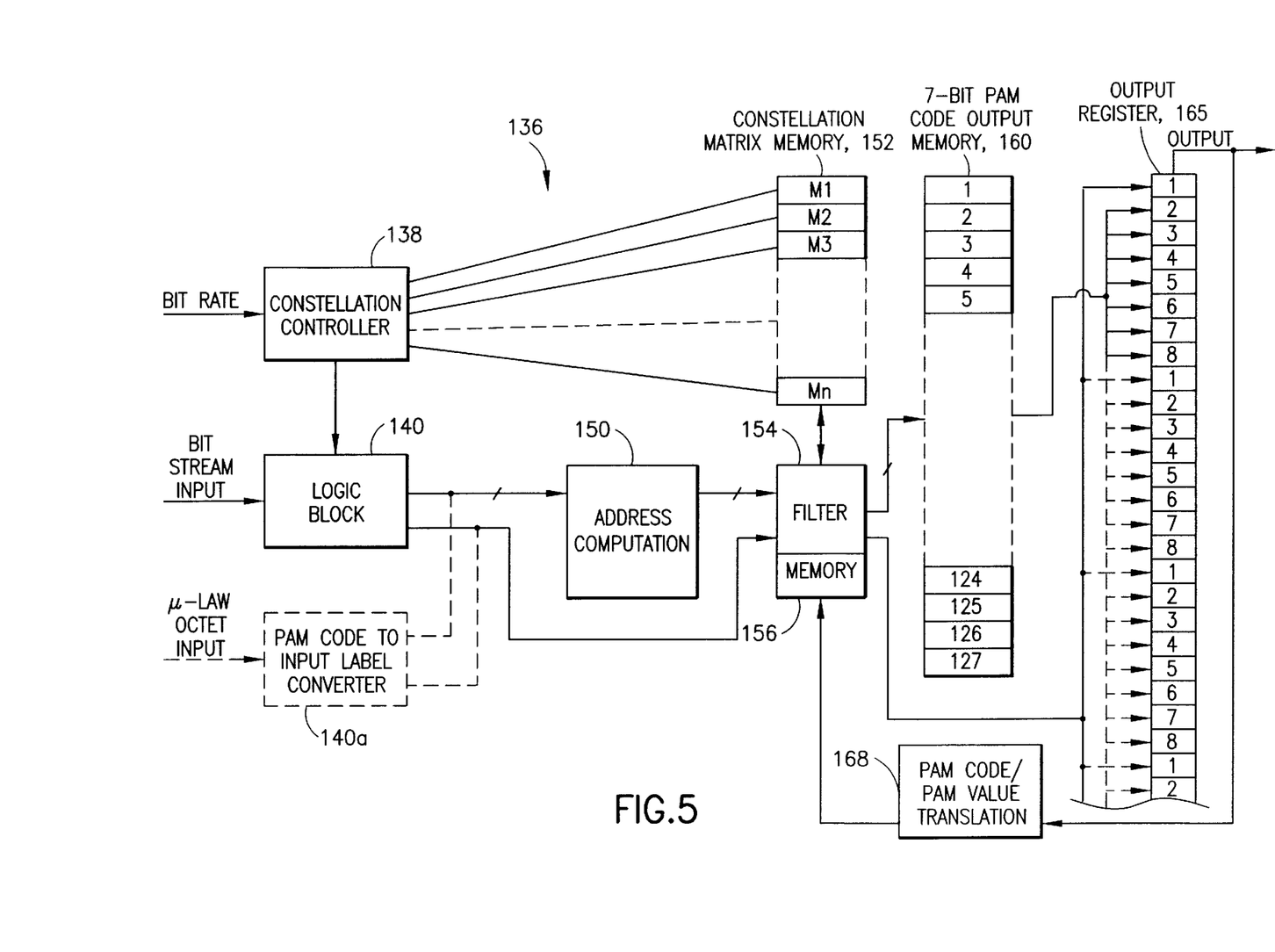
FIG. 5 is a block diagram of the mapper of FIG. 1 according to a second embodiment of the invention.

Turning now to FIG. 5, a block diagram of a mapper 136 according to the presently preferred embodiment of the invention is seen. Mapper 136 includes a constellation controller 138, a logic block 140 (and/or a PAM code to input label converter 140a), an address computation block 150, a constellation matrix memory 152, a filter 154 with associated memory 156, a PAM code output memory 160, an output register 165, and a PAM code to PAM value translator 168. As disclosed in previously incorporated U.S. Ser. No. 08/801,066 filed Feb. 14, 1997, the constellation matrix memory 152 stores indications of n different constellations in 8×16 arrays by setting particular bits to value "1" in particular array locations. Among the n different constellations are included constellations of different dimensions (i.e., multidimensional constellations having other than $2^d$ positive points where d is an integer, as defined in that application). As described in the previously incorporated application, depending upon the determined bit rate, the constellation controller 138 generates a frame which causes different numbers of bits to be grouped together by the logic block 140 and synchronizes the processing of subgroups of those bits with respect to the use of one or more of the-constellations. For example, using the example of a 182 point 2D constellation (91 constellation point indications being stored in one of the constellation matrix memory arrays) as described in the previously incorporated patent application, where fifteen bits are grouped together, two of the fifteen bits are preferably designated as sign bits, and the remaining thirteen bits are processed by the address computation block 150, preferably by dividing the digital value of those thirteen bits by ninety-one to provide a quotient and a remainder. The quotient and a first sign bit are then provided to the filter 154 as a first label, while the remainder and a second sign bit are provided to the filter 154 as a second label. Utilizing the filter algorithms as described above with reference to FIG. 2, the filter generates a first shift for the first label. If the shifted label value is positive where the first label was originally negative, or vice versa, the first sign bit is changed by the filter. Regardless, the value of the shifted first label is used to access a location in the constellation matrix memory 152; i.e., if the shifted label has a value of u, the u'th set value of the appropriately chosen constellation is indicated. The position of that u'th set value is then used to access the corresponding position in the 7-bit PAM code output memory (as discussed in more detail in the previously incorporated patent application), and the sign bit and 7-bit PAM code output are provided to the output register 165 as well as to the translator 168 which feeds back a PAM value back to the memory 156 of the filter 154 in order to permit an updating of the filter variable v(t) (e.g., from v(t) to v(t+1)).

Once the first label provided by the address computation block 150 has been processed by the filter, the second label (remainder value) and second sign bit may also be processed. Thus, the filter 154 generates a second shift value based on the filter algorithms as well as any updated filter variables, and as a result of the second shift, the sign bit may be changed. Regardless, the shifted label is used to access a location in the same constellation accessed by the first shifted label, and the location is used to access the corresponding position in the 7-bit PAM code output memory 160 in order to generate a code output. The second code output with the second sign bit (collectively used to generate out(t)) are provided to the output register 165 (either in second positions shown in phantom, or in the first set of positions if the first 8-bit word has been sent out of the mapper), and the value (out(t)) corresponding to the code (as determined by the translator 168) is fed back to filter memory 156 so that the filter variable v(t) can be updated (e.g., from v(t+1) to v(t+2)).

Where different bit rates are to be accommodated, and as disclosed in detail in the previously incorporated application, different numbers of groups of bits are grouped together in the logic block 140 under control of the constellation controller 138, algorithms are utilized for generating labels, and different constellation indications are accessed in the constellation matrix memory 152. Thus, as indicated in FIG. 5, the 7-bit PAM code output memory preferably includes all one hundred twenty-seven positive μ-law code levels (which together with level zero are seen in Appendix 1) which may be utilized by one or more of the n constellations in the constellation matrix memory 152. It will be appreciated that where the invention relates to μ-law modems, it is possible to eliminate the 7-bit PAM code output memory 160, as the accessed location in the constellation matrix memory can be used directly to generate a 7-bit output code (the 7-bit output code being the digital value of the accessed location in the memory). It will also be appreciated that instead of processing the sign bits separately, by increasing the constellation matrix memory size to include indications of negative values of constellations, and/or by increasing the 7-bit PAM code output memory size to include negative PAM code levels, the sign bits can be processed with the remaining bits.

It should be appreciated that the mapper of FIG. 5 is intended to advantageously merge the filter of the invention into the mapper of the previously incorporated application Ser. No. 08/801,066. However, it should be appreciated that because the mapper of that previously incorporated application can provide (at its output), labels which can be utilized as input labels to the filter of this invention, a filter as set forth in FIG. 2 with a slightly modified PAM code output memory and controls can be utilized as a "back end" to the mapper of the co-owned application.

Figure 6A:
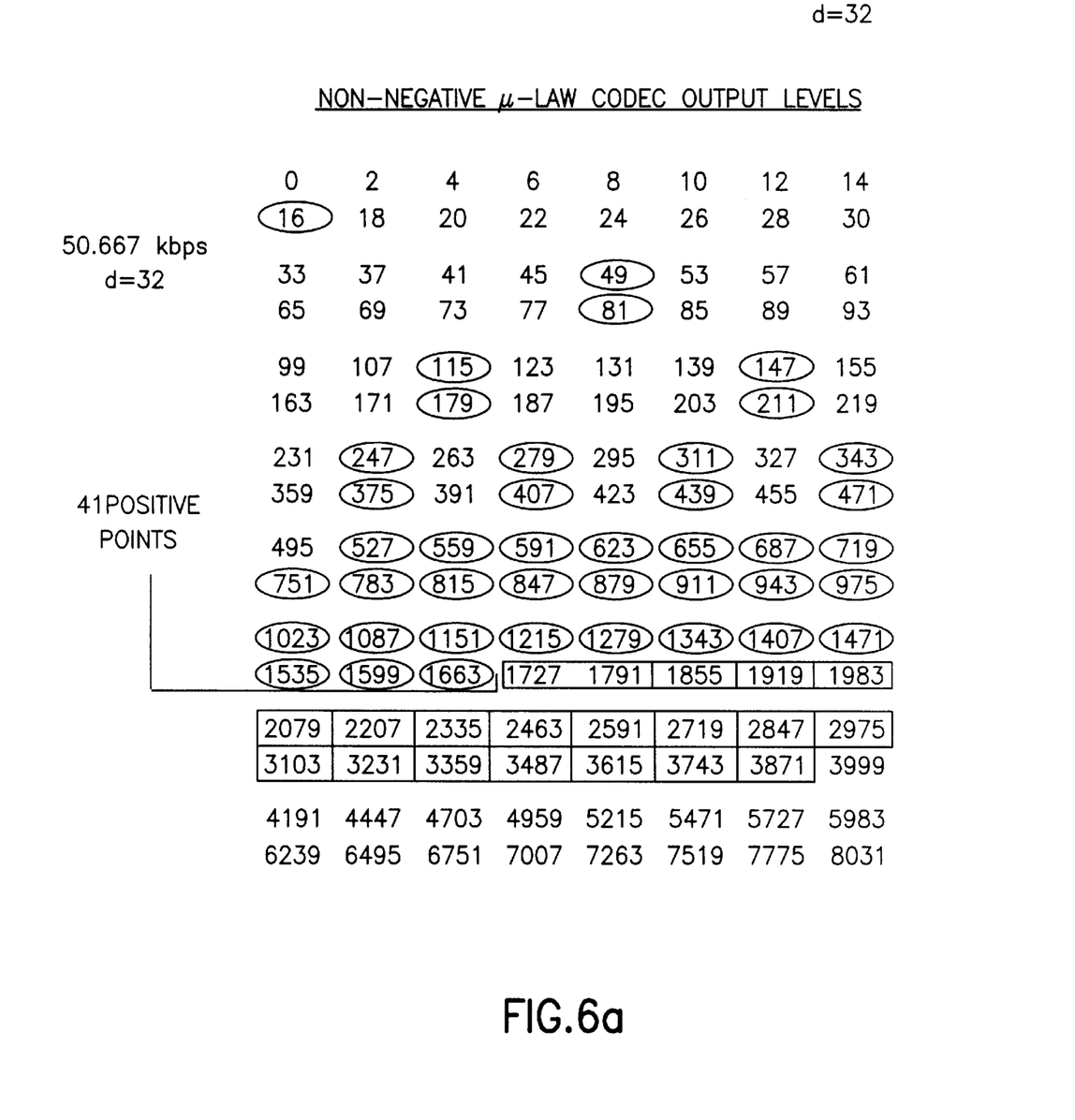
FIGS. 6a and 6b are charts of the non-negative μ-law code level values delimiting the input and output alphabets for two multidimensional constellations according to the second embodiment of the invention.
Figure 7A:
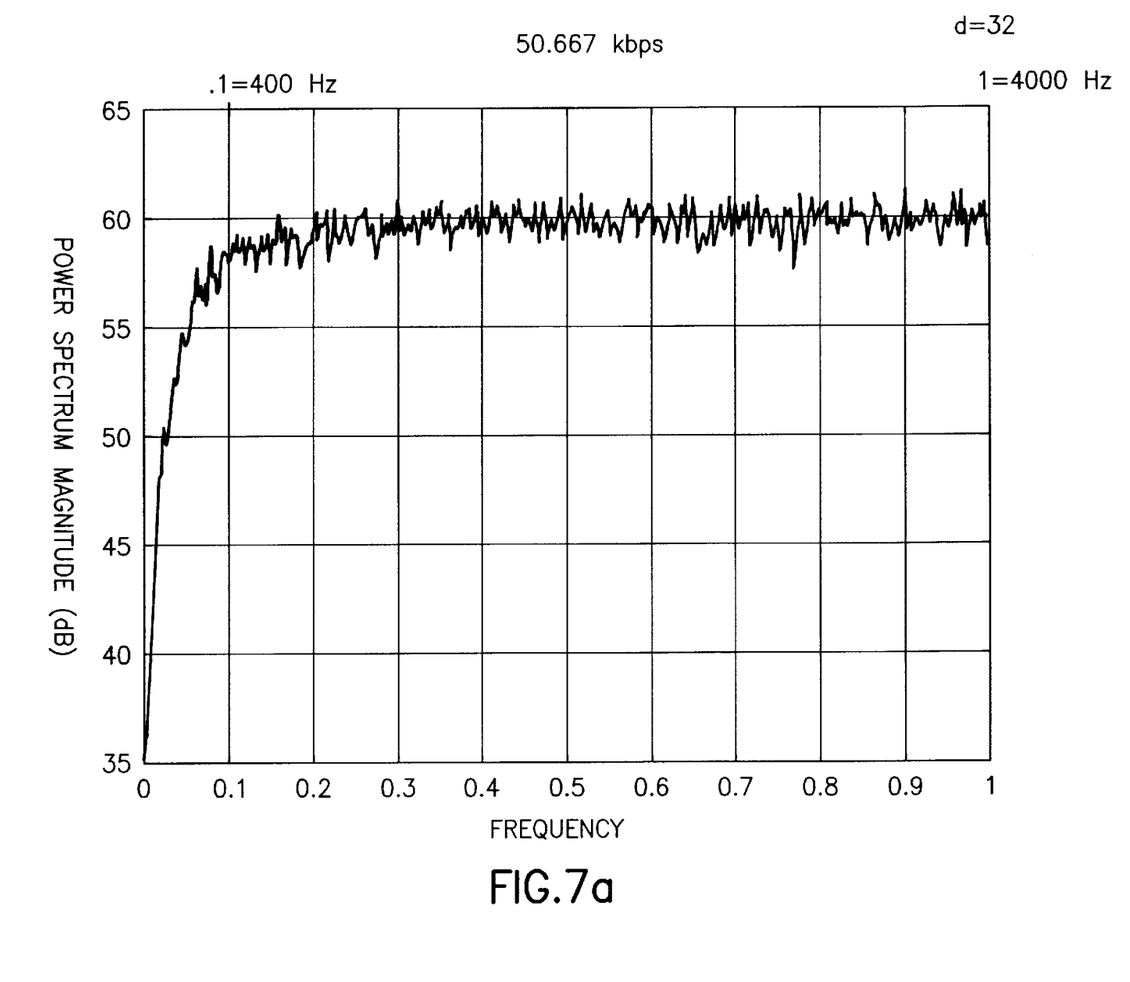
FIGS. 7a and 7b are diagram of the frequency spectra of the output of the mapper of FIG. 5 using the input and output alphabets of FIGS. 6a and 6b respectively; and Appendix 1 is a chart of all the μ-law code levels and code level values.

Turning now to FIG. 6a, a chart of the non-negative μ-law code level values delimiting the input and output alphabets for a three-dimensional constellation is seen according to the second embodiment of the invention. The input alphabet includes forty-one positive points (to allow a 50.667 kbps date rate as discussed in the previously incorporated application) which are circled, while the output alphabet includes sixty-one positive points, including the forty-one circled points and the twenty points indicated by rectangles. Both input and output alphabets have a minimum distance of thirty-two. Using the mapper of FIG. 5, with the filter parameters discussed above with respect to FIG. 2, the frequency spectrum of the output of the mapper of FIG. 5 is seen in FIG. 7a. As shown in FIG. 7a, at 100 Hz, the magnitude of the shaped output signal is about 49 dB which is 11 dB below the flat portion of the spectrum, while at 50

Hz, the magnitude of the output signal is decreased approximately an additional 6 dB to 43 dB. The magnitude of the signal at DC, is severely attenuated to approximately 37 dB.

Figure 6B:
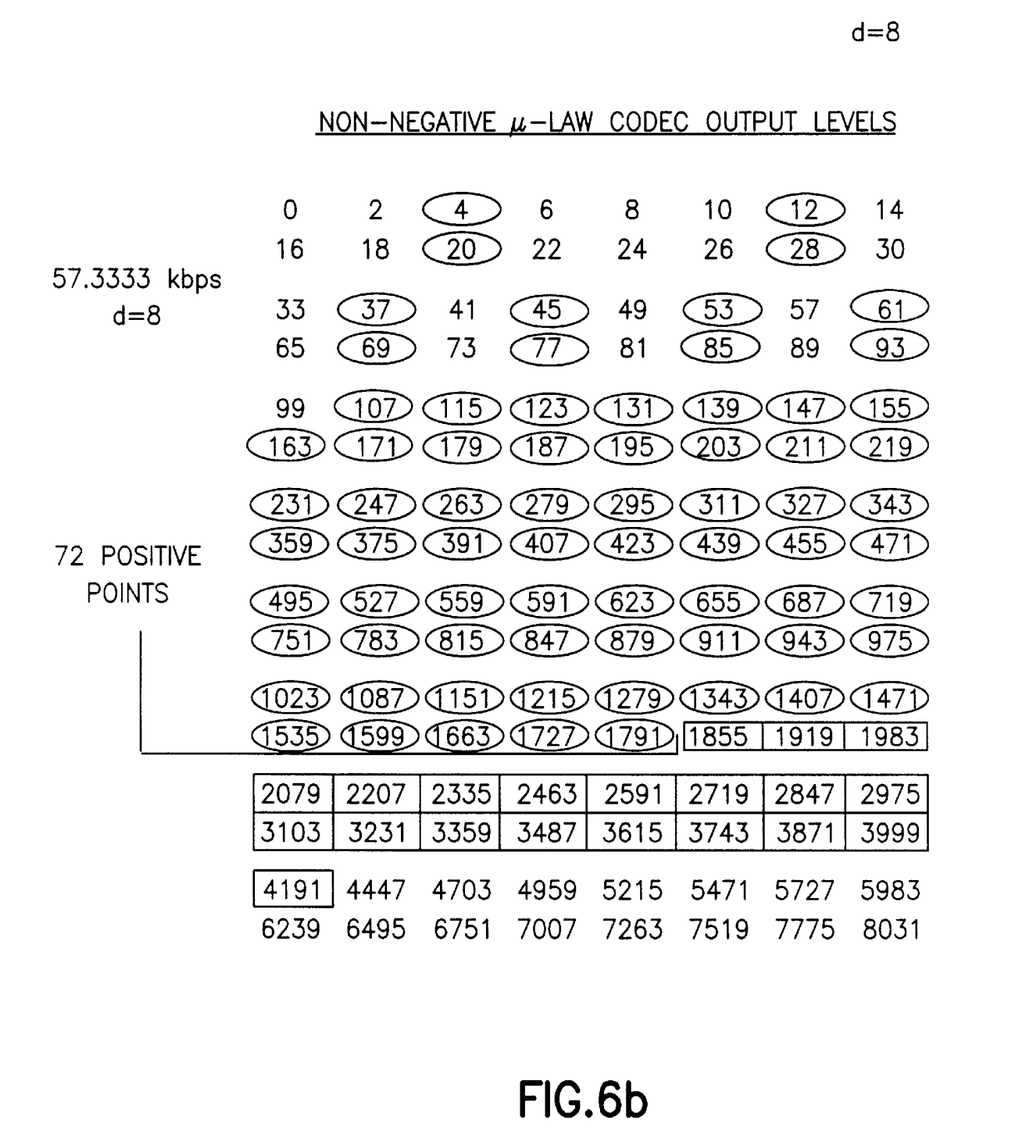
Figure 7B:
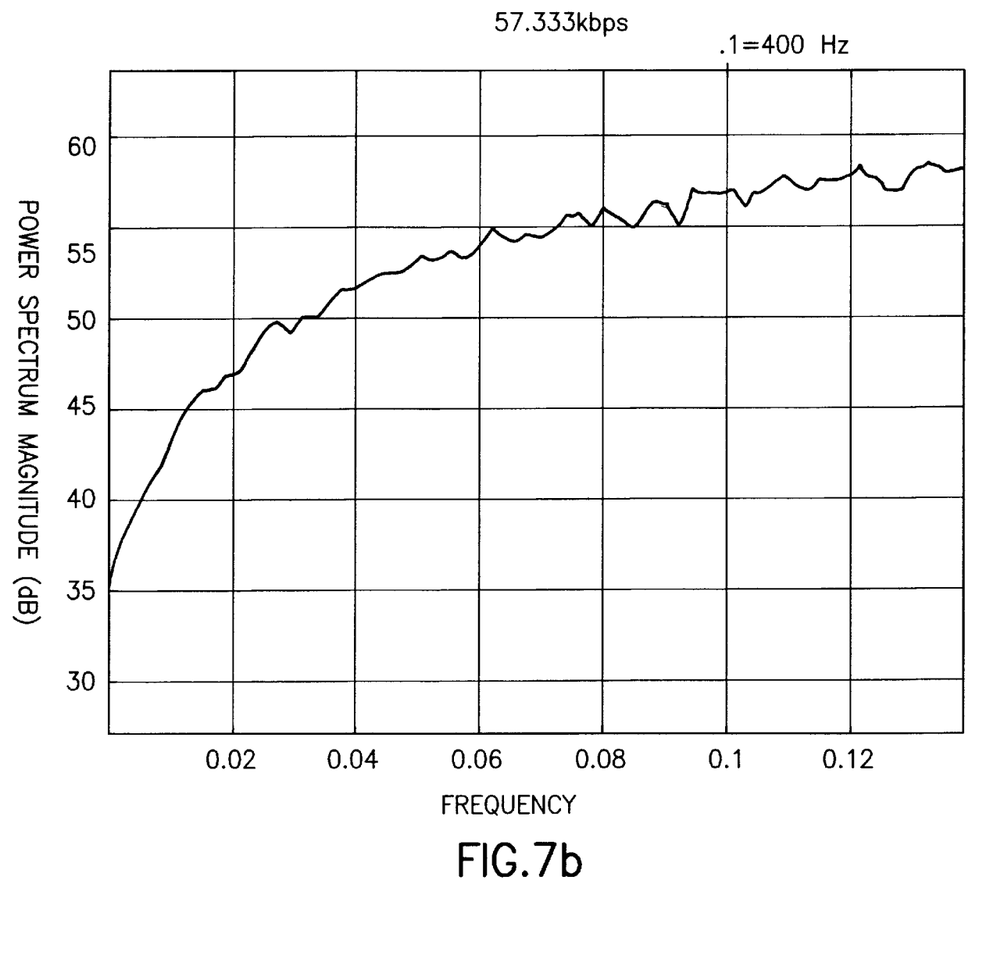

Turning to FIG. 6b, a chart of the non-negative $\mu$-law code level values delimiting the input and output alphabets for a six-dimensional constellation is seen according to the second embodiment of the invention. The input alphabet includes seventy-two positive points (to allow a 57.333 kbps date rate as discussed in the previously incorporated application) which are circled, while the output alphabet includes ninety-two positive points (maxshift=20), including the seventy-two circled points and the twenty points indicated by rectangles. Both input and output alphabets have a minimum distance of eight. Using the mapper of FIG. 5, with the filter parameters discussed above with respect to FIG. 2, the frequency spectrum of the output of the mapper of FIG. 5 is seen in FIG. 7b. As shown in FIG. 7b, at 100 Hz, the magnitude of the shaped output signal is about 47 dB which is 13 dB below the flat portion of the spectrum (not shown at 60 dB), while at 50 Hz, the magnitude of the output signal is decreased approximately an additional 4 dB to 43 dB. The magnitude of the signal at DC, is severely attenuated to approximately 35 dB.

It should be appreciated with reference to the embodiments of FIGS. 2 and 5 that-the input alphabets are never used directly; i.e., the incoming bits are not used to choose an input label from an input alphabet. Rather, in the preferred embodiment, the incoming bits are grouped and used directly as the incoming label. Thus, the input alphabet is only seen when it is shown as part of the output alphabet. In the embodiment of FIG. 5, the constellation matrix memory stores indications of the output alphabet (which includes the input alphabet), while in the embodiment of FIG. 2, the 7-bit PAM code output memory has y locations which correspond to the y elements of the output alphabet (including all of the elements of the input alphabet).

Those skilled in the art will appreciate that the PAM code output memory of FIGS. 2 and 5 is provided so that PAM code octets are generated as required by the telecommunications system in which the modem is utilized. If the system does not require such octets, instead of a 7-bit PAM code output memory, the actual 13- or 14-bit PAM level values could be stored, and a PAM code to PAM value translator would not be required.

Those skilled in the art will appreciate that in the receiver of the modem, a demapper should be utilized which performs the inverse functions of the mapper of the invention.

There have been described and illustrated herein apparatus and methods for the mapping of data in a high data rate modem. While particular embodiments of the invention have been described, it is not intended that the invention be limited exactly thereto, as it is intended that the invention be as broad in scope as the art will permit. Thus, while the invention has been described with respect to certain hardware, it will be appreciated that various functions can be carried in different hardware and/or software. Indeed, the mapper may be software or hardware upgradeable to provide for other mechanisms and algorithms for taking input code levels of a first alphabet and using a filter to provide output code levels of a second alphabet. Also, while a particularly preferred geometric filter with a filter algorithm, filter parameters, and filter constants has been provided, those skilled in the art will appreciate that other filters, algorithms, parameters, and filter constants could be utilized. For example, a linear filter with a delay line could be utilized instead of the geometric filter. If desired, with the linear filter, the delay line could be reset at intervals or according to certain criteria. Similarly, with the geometric filter, the parameter v(t) can be reset periodically or according to certain criteria. Moreover, rather than using only output values out(t) in generating a shift value, input values in(t) could be utilized. If desired, the shifts k can be quantized so that only certain shifts (e.g., shifts of odd numbers) are allowed. Or, if desired, a filter could be provided where shifting occurs only under certain circumstances; e.g., where a shift reduces power. In addition, multiple shift algorithms can be utilized according to a sequence or according to other criteria. Further yet, rather than utilizing shifting which is dictated by the filter type, algorithm, parameters, and constants, the filter of the invention can utilize mappings between the input alphabet and the output alphabet. In sum, by changing the filter type, algorithms, parameters, or constants, similar or different frequency spectra can be obtained, as well as other results. For example, a change in coefficients and/or a change in the implementation of arithmetic operations could provide a filter which deals differently with error propagation; the use of other or multiple shift algorithms can provide better average power characteristics, etc.

With respect to modems, while the invention was described with reference to $\mu$-law constellations, it will be appreciated that other constellations (such as A-law, attached hereto as Appendix 2) could be utilized. Furthermore, while particular input and output alphabets have been described with respect to specific $\mu$-law constellation, it will be understood that other input and output alphabets may also be, defined.

Finally, it should be appreciated by those skilled in the art that the invention-can be applied to any situation where the frequency spectrum of a signal is to be changed, where the input and output alphabets are constrained. Therefore, it will be apparent to those skilled in the art that other changes and modifications may be made to the invention as described in the specification without departing from the spirit and scope of the invention as so claimed.

APPENDIX 1 u-law code (full constellation)

| Sector # | Level # | Level Value | Code 12345678 | Negative Levels | Code 12345678 |
|---|---|---|---|---|---|
| 8 | 127 | 8031 | 10000000 | −8031 | 00000000 |
| 8 | 126 | 7775 | 10000001 | | |
| 8 | 125 | 7519 | 10000010 | | |
| 8 | 124 | 7263 | 10000011 | | |
| 8 | 123 | 7007 | 10000100 | | |
| 8 | 122 | 6751 | 10000101 | | |
| 8 | 121 | 6495 | 10000110 | | |
| 8 | 120 | 6239 | 10000111 | | |
| 8 | 119 | 5983 | 10001000 | | |
| 8 | 118 | 5727 | 10001001 | | |
| 8 | 117 | 5471 | 10001010 | | |
| 8 | 116 | 5215 | 10001011 | | |
| 8 | 115 | 4959 | 10001100 | | |
| 8 | 114 | 4703 | 10001101 | | |
| 8 | 113 | 4447 | 10001110 | | |
| 8 | 112 | 4191 | 10001111 | −4191 | 00001111 |
| 7 | 111 | 3999 | 10010000 | −3999 | 00010000 |
| 7 | 110 | 3871 | 10010001 | | |
| 7 | 109 | 3747 | 10010010 | | |
| 7 | 108 | 3615 | 10010011 | | |
| 7 | 107 | 3487 | 10010100 | | |
| 7 | 106 | 3359 | 10010101 | | |
| 7 | 105 | 3231 | 10010110 | | |
| 7 | 104 | 3103 | 10010111 | | |
| 7 | 103 | 2975 | 10011000 | | |
| 7 | 102 | 2847 | 10011001 | | |
| 7 | 101 | 2719 | 10011010 | | |

APPENDIX 1-continued u-law code (full constellation)

| Sector # | Level # | Level Value | Code 12345678 | Negative Levels | Code 12345678 |
|---|---|---|---|---|---|
| 7 | 100 | 2591 | 10011011 | | |
| 7 | 99 | 2463 | 10011100 | | |
| 7 | 98 | 2335 | 10011101 | | |
| 7 | 97 | 2207 | 10011110 | | |
| 7 | 96 | 2079 | 10011111 | −2079 | 00011111 |
| 6 | 95 | 1983 | 10100000 | −1983 | 00100000 |
| 6 | 94 | 1919 | 10100001 | | |
| 6 | 93 | 1855 | 10100010 | | |
| 6 | 92 | 1791 | 10100011 | | |
| 6 | 91 | 1727 | 10100100 | | |
| 6 | 90 | 1663 | 10100101 | | |
| 6 | 89 | 1599 | 10100110 | | |
| 6 | 88 | 1535 | 10100111 | | |
| 6 | 87 | 1471 | 10101000 | | |
| 6 | 86 | 1407 | 10101001 | | |
| 6 | 85 | 1343 | 10101010 | | |
| 6 | 84 | 1279 | 10101011 | | |
| 6 | 83 | 1215 | 10101100 | | |
| 6 | 82 | 1151 | 10101101 | | |
| 6 | 81 | 1087 | 10101110 | | |
| 6 | 80 | 1023 | 10101111 | −1023 | 00101111 |
| 5 | 79 | 975 | 10110000 | −975 | 00110000 |
| 5 | 78 | 943 | 10110001 | | |
| 5 | 77 | 911 | 10110010 | | |
| 5 | 76 | 879 | 10110011 | | |
| 5 | 75 | 847 | 10110100 | | |
| 5 | 74 | 815 | 10110101 | | |
| 5 | 73 | 783 | 10110110 | | |
| 5 | 72 | 751 | 10110111 | | |
| 5 | 71 | 719 | 10111000 | | |
| 5 | 70 | 687 | 10111001 | | |
| 5 | 69 | 655 | 10111010 | | |
| 5 | 68 | 623 | 10111011 | | |
| 5 | 67 | 591 | 10111100 | | |
| 5 | 66 | 559 | 10111101 | | |
| 5 | 65 | 527 | 10111110 | | |
| 5 | 64 | 495 | 10111111 | −495 | 00111111 |
| 4 | 63 | 471 | 11000000 | −471 | 01000000 |
| 4 | 62 | 455 | 11000001 | | |
| 4 | 61 | 439 | 11000010 | | |
| 4 | 60 | 423 | 11000011 | | |
| 4 | 59 | 407 | 11000100 | | |
| 4 | 58 | 391 | 11000101 | | |
| 4 | 57 | 375 | 11000110 | | |
| 4 | 56 | 359 | 11000111 | | |
| 4 | 55 | 343 | 11001000 | | |
| 4 | 54 | 327 | 11001001 | | |
| 4 | 53 | 311 | 11001010 | | |
| 4 | 52 | 295 | 11001011 | | |
| 4 | 51 | 279 | 11001100 | | |
| 4 | 50 | 263 | 11001101 | | |
| 4 | 49 | 247 | 11001110 | | |
| 4 | 48 | 231 | 11001111 | −231 | 01001111 |
| 3 | 47 | 219 | 11010000 | −219 | 01010000 |
| 3 | 46 | 211 | 11010001 | | |
| 3 | 45 | 203 | 11010010 | | |
| 3 | 44 | 195 | 11010011 | | |
| 3 | 43 | 187 | 11010100 | | |
| 3 | 42 | 179 | 11010101 | | |
| 3 | 41 | 171 | 11010110 | | |
| 3 | 40 | 163 | 11010111 | | |
| 3 | 39 | 155 | 11011000 | | |
| 3 | 38 | 147 | 11011001 | | |
| 3 | 37 | 139 | 11011010 | | |
| 3 | 36 | 131 | 11011011 | | |
| 3 | 35 | 123 | 11011100 | | |
| 3 | 34 | 115 | 11011101 | | |
| 3 | 33 | 107 | 11011110 | | |
| 3 | 32 | 99 | 11011111 | −99 | 01011111 |
| 2 | 31 | 93 | 11100000 | −93 | 01100000 |
| 2 | 30 | 89 | 11100001 | | |
| 2 | 29 | 85 | 11100010 | | |
| 2 | 28 | 81 | 11100011 | | |
| 2 | 27 | 77 | 11100100 | | |
| 2 | 26 | 73 | 11100101 | | |
| 2 | 25 | 69 | 11100110 | | |
| 2 | 24 | 65 | 11100111 | | |
| 2 | 23 | 61 | 11101000 | | |
| 2 | 22 | 57 | 11101001 | | |
| 2 | 21 | 53 | 11101010 | | |
| 2 | 20 | 49 | 11101011 | | |
| 2 | 19 | 45 | 11101100 | | |
| 2 | 18 | 41 | 11101101 | | |
| 2 | 17 | 37 | 11101110 | | |
| 2 | 16 | 33 | 11101111 | −33 | 01101111 |
| 1 | 15 | 30 | 11110000 | −30 | 01110000 |
| 1 | 14 | 28 | 11110001 | | |
| 1 | 13 | 26 | 11110010 | | |
| 1 | 12 | 24 | 11110011 | | |
| 1 | 11 | 22 | 11110100 | | |
| 1 | 10 | 20 | 11110101 | | |
| 1 | 9 | 18 | 11110110 | | |
| 1 | 8 | 16 | 11110111 | | |
| 1 | 7 | 14 | 11111000 | | |
| 1 | 6 | 12 | 11111001 | | |
| 1 | 5 | 10 | 11111010 | | |
| 1 | 4 | 8 | 11111011 | | |
| 1 | 3 | 6 | 11111100 | | |
| 1 | 2 | 4 | 11111101 | | |
| 1 | 1 | 2 | 11111110 | −2 | 01111110 |
| 1 | 0 | 0 | 11111111 | 0 | 11111111 |

I claim:

1. A PAM mapper, comprising:

a) means for receiving incoming information;

b) means for generating an indication of a PAM code from said incoming information, said PAM code being constrained by an input alphabet and having a first frequency spectrum; and c) filter means for filtering said indication into an indication of a PAM output code having a second frequency spectrum different than said first frequency spectrum, said PAM output code being constrained to discrete values of an output alphabet.

2. A PAM mapper according to claim 1, wherein:

said input alphabet is a proper subset of said output alphabet.

3. A PAM mapper according to claim 1, wherein:

said input alphabet and said output alphabet are proper subsets of one of $\mu$-law and A-law code levels.

4. A PAM mapper according to claim 3, wherein:

said first frequency spectrum is substantially flat at all frequencies, and said second frequency spectrum is substantially flat at high frequencies, and is attenuated from a first level at said high frequencies by at least 5 dB at 100 Hz, and is attenuated from said first level by at least 10 dB at 50 Hz and therebelow.

5. A PAM mapper according to claim 1, wherein:

said filter means determines an integer shift value (k), said integer shift value being used in obtaining said indication of said PAM output code from said indication of said PAM code.

6. A PAM mapper according to claim 5, wherein:

said indication of said PAM output code is an octet, and said filter means utilizes said PAM output code indicated by said indication in generating a subsequent integer shift value.

7. A PAM mapper according to claim 6, further comprising:

PAM output code to PAM value translation means coupled to said filter, for taking said indication of a PAM output code, and for generating therefrom a PAM value for feedback to said filter means.

8. A PAM mapper according to claim 7, wherein:

said shift value k is a function of a summation $$\sum_{i=1}^{N} a_i \text{ out } (t-i) = V,$$

where $a_i$ are weighting factors, i is dummy variable of time, N is a positive integer or infinity, and out(t) is said PAM value at time t.

9. A PAM mapper according to claim 8, wherein:

said summation is implemented as a simple geometric series such that $v(t)=g \text{ out}(t-1)+g^2 \text{ out}(t-2)+g^3 \text{ out}(t-3)+ \ldots$, with N effectively equalling infinity.

10. A PAM mapper according to claim 9, wherein:

said filter means includes memory means for storing a present value for said v(t), and said filter means includes means for updating v(t) according to v(t+1)= g(v(t)+out(t)), where g is a constant.

11. A PAM mapper according to claim 10, wherein:

in determining k, said filter means calculates a value for a variable x which is the smaller of one and an absolute value of V/denom, where denom is an expansion factor for said filter means.

12. A PAM mapper according to claim 11, wherein:

in determining k, said filter means calculates a value for a variable p which is a function of x.

13. A PAM mapper according to claim 12, wherein:

$p=c_1 x - c_2 x^2$, where $c_1$ and $c_2$ are constants.

14. A PAM mapper according to claim 13, wherein:

k is chosen as the minimum of maxshift and an integer rounded value of p, where maxshift is a constant.

15. A PAM mapper according to claim 1, wherein: said incoming information comprises a stream of bits, and said means for receiving groups a plurality of said stream of bits to provide an input label which comprises said indication of a PAM code.

16. A PAM mapper according to claim 1, wherein:

said incoming information comprises a $\mu$-law octet, and said means for receiving translates said $\mu$-law octet into an input label which comprises said indication of a PAM code.

17. A PAM mapper, comprising:

a) means for generating input PAM code labels constrained by an input alphabet and having a first frequency spectrum;

b) filter means for filtering said input PAM code labels and generating indications of PAM output codes having a second frequency spectrum different than said first frequency spectrum, said PAM output codes being constrained to discrete values of an output alphabet, wherein said input alphabet is a subset of said output alphabet.

18. A method for mapping indications of telecommunications signals, comprising:

a) obtaining information indicative of PAM code information, said PAM code information constrained by an input alphabet and having a first frequency spectrum;

b) filtering said information to obtain indications PAM code outputs having a second frequency spectrum different than said first frequency spectrum, said PAM code outputs being constrained to discrete values of an output alphabet, said input alphabet being a subset of said output alphabet.

19. A method according to claim 18, wherein:

said first frequency spectrum is substantially flat at all frequencies, and said second frequency spectrum is substantially flat at high frequencies, and is attenuated from a first level at said high frequencies by at least 5 dB at 100 Hz, and is attenuated from said first level by at least 10 dB at 50 Hz and therebelow.

20. A PAM mapper according to claim 18, wherein:

said filtering determines an integer shift value (k), said integer shift value being used in obtaining said indications of PAM code outputs.

* * * * *